(12) United States Patent
Benjamin et al.

(10) Patent No.: US 8,935,144 B2
(45) Date of Patent: Jan. 13, 2015

(54) SYSTEM AND METHOD FOR EXAMINING CONCURRENT SYSTEM STATES

(75) Inventors: Kamara Akili Benjamin, Bellevue, WA (US); Guy-Vincent Jourdan, Ottawa (CA); Iosif Viorel Onut, Ottawa (CA); Gregor von Bochmann, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 13/458,188

(22) Filed: Apr. 27, 2012

(65) Prior Publication Data

US 2012/0278059 A1 Nov. 1, 2012

(30) Foreign Application Priority Data

Apr. 28, 2011 (CA) ..................................... 2738422

(51) Int. Cl.
*G06F 17/50* (2006.01)
*G06F 9/44* (2006.01)
*G06F 15/173* (2006.01)

(52) U.S. Cl.
CPC .......... *G06F 8/314* (2013.01); *G06F 15/17387* (2013.01)
USPC ................................ 703/13; 703/22; 716/106

(58) Field of Classification Search
None
See application file for complete search history.

(56) References Cited

U.S. PATENT DOCUMENTS

| | | |
|---|---|---|
| 5,937,181 A | 8/1999 | Godefroid et al. |
| 6,178,394 B1 | 1/2001 | Godefroid |
| 6,665,658 B1 | 12/2003 | DaCosta et al. |
| 6,938,170 B1 | 8/2005 | Kraft et al. |
| 7,328,269 B1 | 2/2008 | Danner et al. |
| 7,539,980 B1* | 5/2009 | Bailey et al. ................... 717/135 |
| 7,546,370 B1 | 6/2009 | Acharya et al. |
| 7,680,785 B2 | 3/2010 | Najork |
| 7,765,094 B2* | 7/2010 | Bodden et al. .................. 703/22 |
| 7,783,470 B2* | 8/2010 | Kahlon ............................ 703/22 |
| 7,827,166 B2 | 11/2010 | Garg et al. |
| 2002/0040470 A1* | 4/2002 | Guthrie et al. ................ 717/126 |
| 2004/0078674 A1* | 4/2004 | Raimi et al. ..................... 714/33 |
| 2005/0080600 A1* | 4/2005 | Courtay ............................ 703/2 |
| 2005/0086648 A1 | 4/2005 | Andrews et al. |
| 2005/0118557 A1* | 6/2005 | Sumner et al. ................ 434/118 |

(Continued)

OTHER PUBLICATIONS

E. M. Clarke, "Model Checking with the Partial Order Reduction," Computer Science Department, Carnegie Mellon University, Nov. 18, 2008.*

(Continued)

*Primary Examiner* — Omar Fernandez Rivas
*Assistant Examiner* — Joseph J Rokita
(74) *Attorney, Agent, or Firm* — Holland & Knight LLP; Brian J. Colandreo, Esq.; Jeffrey T. Placker, Esq.

(57) ABSTRACT

A computer-implemented process, computer program product, and apparatus for examining concurrent system state space models. A system has concurrent events to create a modeled system. A minimal chain decomposition of the modeled system is created to identify a set of chains. All chains in the set of chains are extended, and a first set of paths is generated, wherein the first set of paths is a minimal set of paths covering all states of the modeled system. The first set of paths is explored. It is optionally determined whether all transitions have been covered. Responsive to a determination that all transitions have not been covered, remaining paths are explored by traversing a graph induced by the modeled system using a depth-first strategy.

17 Claims, 6 Drawing Sheets

(56) References Cited

U.S. PATENT DOCUMENTS

| | | | |
|---|---|---|---|
| 2005/0246682 A1 | 11/2005 | Hines | |
| 2007/0143093 A1* | 6/2007 | Alvey et al. | 703/22 |
| 2007/0143742 A1 | 6/2007 | Kahlon et al. | |
| 2007/0283425 A1 | 12/2007 | Ture et al. | |
| 2008/0086296 A1* | 4/2008 | Kahlon | 703/23 |
| 2008/0104256 A1 | 5/2008 | Olston | |
| 2008/0148235 A1* | 6/2008 | Foresti et al. | 717/123 |
| 2008/0235163 A1 | 9/2008 | Balasubramanian et al. | |
| 2010/0076954 A1 | 3/2010 | Dulitz et al. | |
| 2010/0131804 A1* | 5/2010 | DasBarman et al. | 714/52 |
| 2010/0250744 A1* | 9/2010 | Hadad et al. | 709/226 |
| 2012/0143588 A1* | 6/2012 | Liu et al. | 703/22 |
| 2012/0278059 A1 | 11/2012 | Benjamin et al. | |
| 2012/0278480 A1 | 11/2012 | Ionescu et al. | |
| 2012/0278699 A1 | 11/2012 | Benjamin et al. | |

OTHER PUBLICATIONS

E. M. Clarke et al., "State space reduction using partial order techniques," 1999, Int J STTT, 2: 279-287.*

S. Chaki et al., "State/Event-Based Software Model Checking" (2004), Carnegie Mellon University Computer Science Department, Paper 409.*

J. Simsa et al., "dBug: Systematic Evaluation of Distributed Systems," Jun. 3, 2010, Carnegie Mellon University Computer Science Department.*

M. K. Ganai et al., "Efficient State Space Exploration: Interleaving Stateless and State-based Model Checking," 2010 IEEE/ACM International Conference on Computer-Aided Design (ICCAD), Nov. 7-11, 2010, pp. 786-793.*

S. J. MacKinnon, "An Optimal Algorithm for Assigning Cryptographic Keys to Control Access in a Hierarchy," IEEE Transactions on Computers, vol. c-34, No. 9, Sep. 1985.*

Sharma et al., "Self Adjusting Refresh Time Based Architecture for Incremental Web Crawler," IJCSNS International Journal of Computer Science and Network Security, vol. 8, No. 12, Dec. 2008, pp. 349-354.

"Practical Web Crawling Issues," http://www.chato.cl/papers/crawling_thesis/practical.pdf, downloaded May 2, 2013, pp. 1-12.

Hiraishi, "Reduced State Space Generation of Concurrent Systems Using Weak Persistency," http://www.springerlink.com/content/m4762m528544r286/, IEICE Trans. Fundamentals, vol. E77-A, No. 10, Oct. 1994, downloaded on May 2, 2013, pp. 1602-1606.

Godefroid, "Partial-Order Methods for the Verification of Concurrent Systems, An Approach to the State-Explosion Problem," 1994-1995, http://toolkit.dialog.com/intranet/cgi/present?STYLE=1360084482&PRESENT=DB=35, AN=1421034,FM=9,SEARCH=MD.GenericSearch, downloaded on May 2, 2013, pp. 1-136.

Karacali, "Simultaneious Reachability Analysis of Concurrent Systems," North Carolina State University, 2000, http://toolkit.dialog.com/intranet/cgi/present?STYLE=1360084482&PRESENT=DB=35,AN=1791309,FM=9,Search=MD.GenericSearch, downloaded on May 2, 2013, pp. 1-24.

Dilworth, "A Decomposition Theorem for Partially Ordered Sets", Annals of Mathematics, Jan. 1950, vol. 51, No. 1, pp. 161-166.

Hsu et al., "Partitioning the Boolean Lattice into Chains of Large Minimum Size", Journal of Combinatorial Theory, vol. 97(1), Jan. 12, 2000, pp. 1-17.

Yeh et al., "Tracking the Changes of Dynamic Web Pages in the Existence of URL Rewriting," http://delivery.acm.org/10.1145/1280000/1273831/p169-yeh.pdf?key1=1273831&key2=7087235921&coll=DL&dl=ACM&CFID=5856056&CFTOKEN=88576545, downloaded on May 2, 2013, pp. 169-176.

Anderson, "Combinatorics of Finite Sets," Oxford Univ. Press, London, 1987, pp. vii-250.

* cited by examiner

FIG. 5
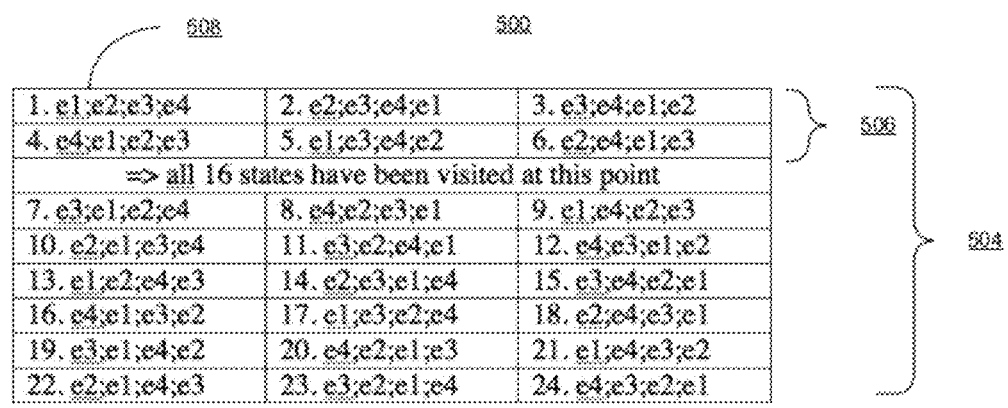
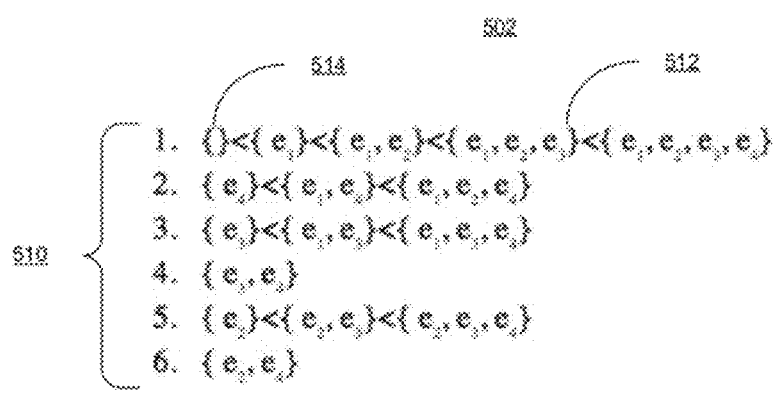

US 8,935,144 B2

SYSTEM AND METHOD FOR EXAMINING CONCURRENT SYSTEM STATES

RELATED APPLICATION

This application claims the benefit of Canadian Patent Application Number 2,738,422 filed on Apr. 28, 2011, the entire contents of which are herein incorporated by reference.

TECHNICAL FIELD

This disclosure relates generally to concurrent systems in a data processing system and more specifically to examining concurrent system state space in the data processing system.

BACKGROUND

Concurrent systems have typically been at the heart of computing for decades. More recently, Web-based applications have become ubiquitous; with a new trend amongst Web-based application emerging in the form of rich Internet applications (RIAs). Rich Internet applications use technologies including, e.g., Ajax, Flex® or Silverlight®, and break away from a traditional view of web application having server-side computation and synchronous communications between a web client and servers. RIAs are now true concurrent systems. (Flex is a registered trademark of Adobe Systems Incorporated in the United States and/or other countries; Silverlight is a registered trademark of Microsoft Corporation in the United States and/or other countries.)

Concurrent systems are typically difficult to design and to test. A fundamental issue is one of states explosion. For example, when n concurrent actions are executed on a system, there are, e.g., $2^n$ possible intermediate states and n! different ways of executing the actions. With a relatively small value for n, the number of possibilities may quickly become unmanageable. Designers may quickly lose track of the possible combinations inside the system being designed, and testing tools typically cannot cover all cases. Consequently, concurrent systems are often released without a full assessment by the engineers designing the systems, and without fully testing the systems.

When attempting to model a concurrent system (for testing, for crawling, for simulation or other use), a typical approach may include using a modeling tool that encodes concurrency efficiently. For example, Petri Nets, Unified Modeling Language (UML), and Partial Order Input/Output Automata (POIOA) are a few of these models. (Unified Modeling Language is a registered trademark of Object Management Group Inc. in the U.S. and other countries.) While the stated approach may enable creation of a model, the approach does not assist in using the model. A model may be created of a reasonable size, but complexity may remain an issue when the model is explored.

One (or a few) orders of execution are typically arbitrarily chosen for a test. While a selection may be practical, but there may be no guaranty chosen orders are interesting choices, and remaining orders not tested are not problematic. Moreover, with such an approach, the test is typically partial, even when the actual size of the model may be small and time permits an exhaustive test.

Heuristics may be used to decide orders of execution for testing. Depending on a situation and selected heuristic, an improvement over a previous approach may occur. However, the same limitations may apply intrinsically. An exhaustive test should be performed. In a typical real life system, an exhaustive test may be a theoretical solution, because the test might not be done within an acceptable timeframe. Attempting all possible combinations may be very time-consuming, but running a single possible sequence (or a few) may not be an acceptable trade-off.

SUMMARY OF DISCLOSURE

According to one embodiment, a computer-implemented process for examining concurrent system state space models comprises having concurrent events to create a modeled system and creates a minimal chain decomposition of the modeled system to identify a set of chains. The computer-implemented process extends all chains in the set of chains, and generates a first set of paths, wherein the first set of paths is a minimal set of paths covering all states of the modeled system. The computer-implemented process explores the first set of paths.

According to another embodiment, a computer program product resides on a computer readable medium that has a plurality of instructions stored on it. When executed by a processor, the instructions cause the processor to perform operations comprising modeling a system having concurrent events to create a modeled system, creating a minimal chain decomposition of the modeled system to identify a set of chains, extending all chains in the set of chains, generating a first set of paths, wherein the first set of paths is a minimal set of paths covering all states of the modeled system, and exploring the first set of paths.

According to another embodiment, an apparatus for examining concurrent system state space comprises a communications fabric, a memory connected to the communications fabric, wherein the memory contains a plurality of instructions, a communications unit connected to the communications fabric, an input/output unit connected to the communications fabric, a display connected to the communications fabric and a processor unit connected to the communications fabric. The processor unit executes the a plurality of instructions to direct the apparatus to model a system having concurrent events to create a modeled system, create a minimal chain decomposition of the modeled system to identify a set of chains, extend all chains in the set of chains, generate a first set of paths, wherein the first set of paths is a minimal set of paths covering all states of the modeled system, and explore the first set of paths.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 5 is a text representation of a minimal chain decomposition of the hypercube of FIG. 4, in accordance with one embodiment of the disclosure.

DETAILED DESCRIPTION OF THE EMBODIMENTS

Figure 1:
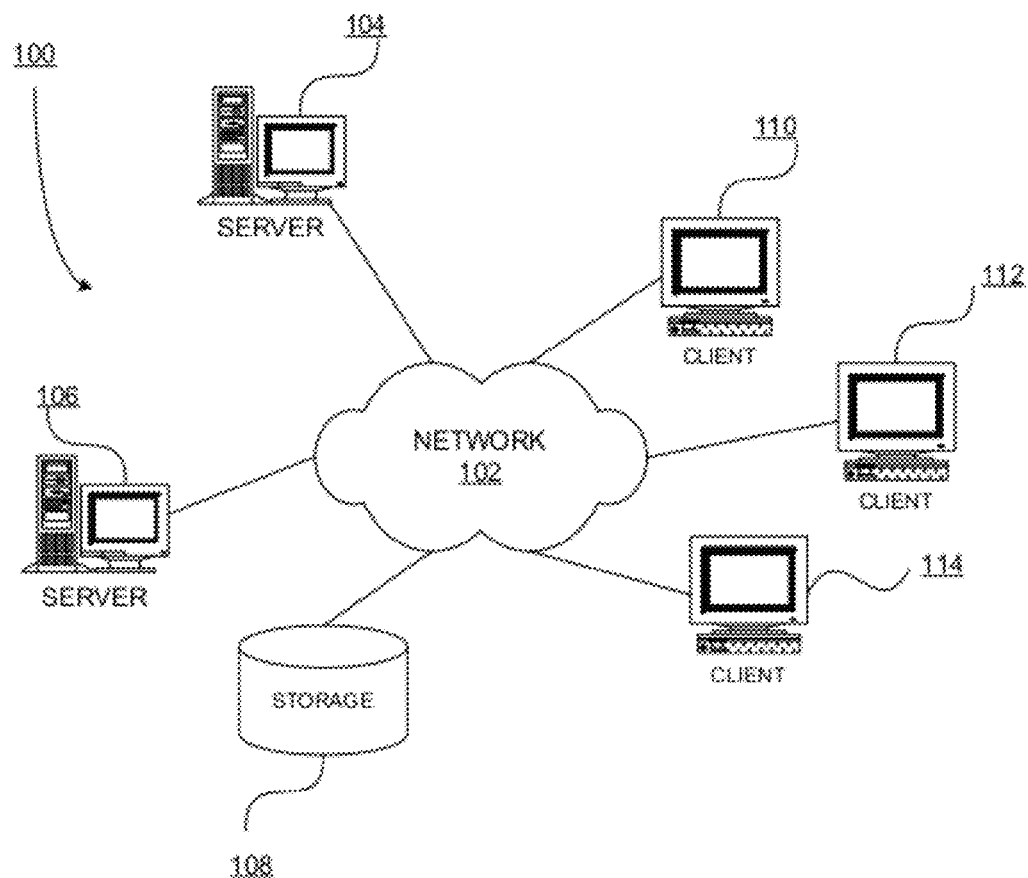
FIG. 1 is a block diagram of an exemplary data processing system network operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks or registered trademarks of Oracle and/or its affiliates. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
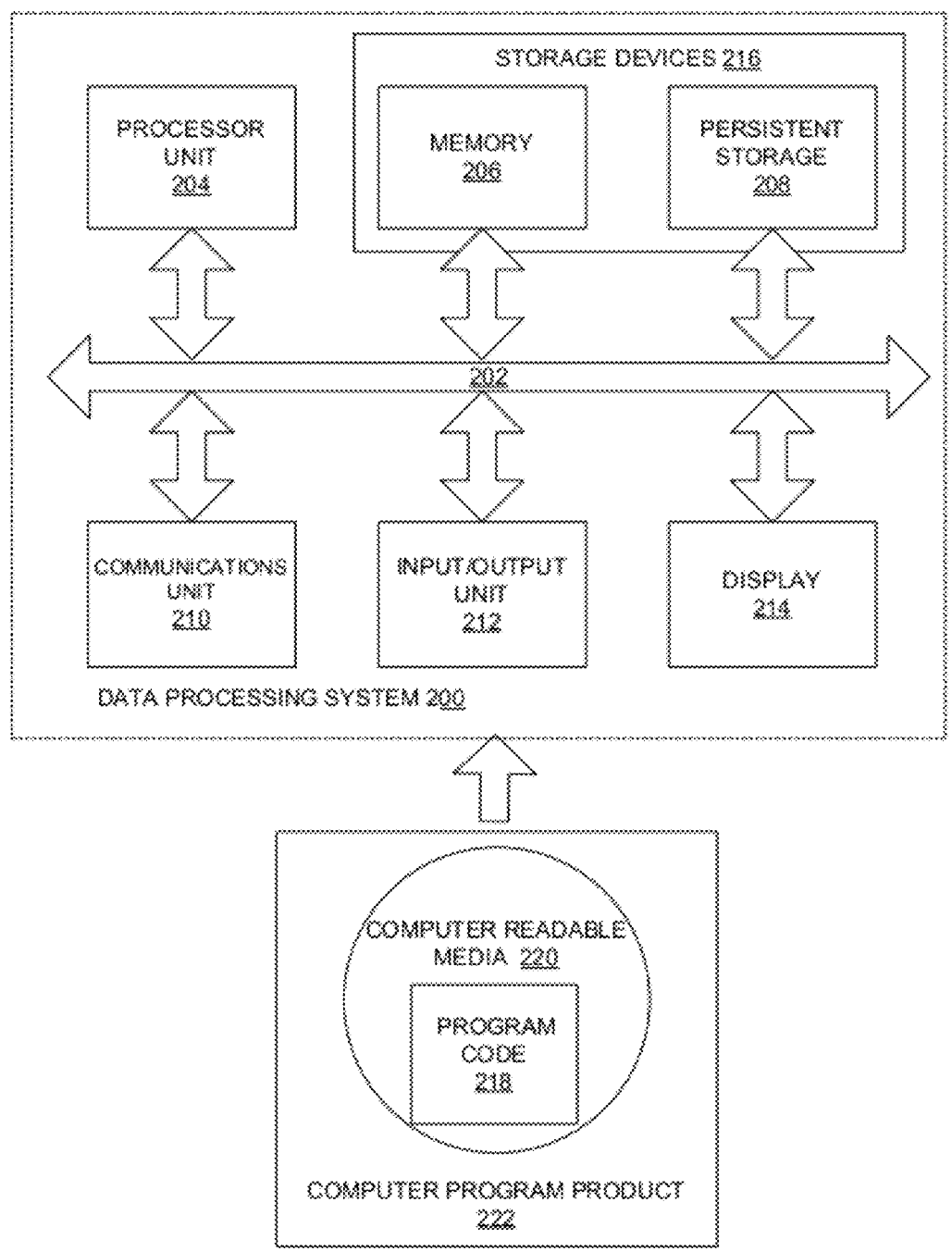
FIG. 2 is a block diagram of an exemplary data processing system operable for various embodiments of the disclosure.

With reference now to the figures and in particular with reference to FIGS. 1-2, example diagrams of data processing environments are provided in which illustrative embodiments may be implemented. It should be appreciated that all figures, including FIGS. 1-2, are only examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 may contain network 102, which may be the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2, a block diagram of an example data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which may be in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 may be located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Additionally/alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for examining concurrent system state space is presented. A process for examining concurrent system state space provides a capability for exploring, testing or modeling a concurrent system space. Processor unit 204 may model a system having concurrent events to create a modeled system. Processor unit 204 may create a minimal chain decomposition of the modeled system to identify a set of chains. Processor unit 204 may extend all chains in the set of chains, and may generate a first set of paths. Processor unit 204 may explore the first set of paths. Optionally, processor 204 may determine whether all transitions have been covered; and responsive to a determination that all transitions have not been covered, may explore remaining paths by, e.g., traversing a graph induced by the modeled system using a depth-first strategy.

In another example, a computer-implemented process, using program code 218 stored in memory 206 or as a computer program product 222, for exploring concurrent system state space comprises a computer recordable storage media, such as computer readable media 220, containing computer executable program code stored thereon. The computer executable program code comprises computer executable program code for examining concurrent system state space.

According to one embodiment, a computer-implemented process may create an examination strategy for exploring, testing and/or modeling a concurrent system space. The strategy may comprise using a minimal set of chains, in which a chain represents a sequence of one or more actions followed to complete an associated task. The minimal chain decomposition may provide an optimal set of paths for reaching all possible states of the concurrent system space.

In another illustrative embodiment, the process for examining concurrent system state space may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus may execute the computer executable program code to direct the apparatus to examine concurrent system state space.

Figure 3:
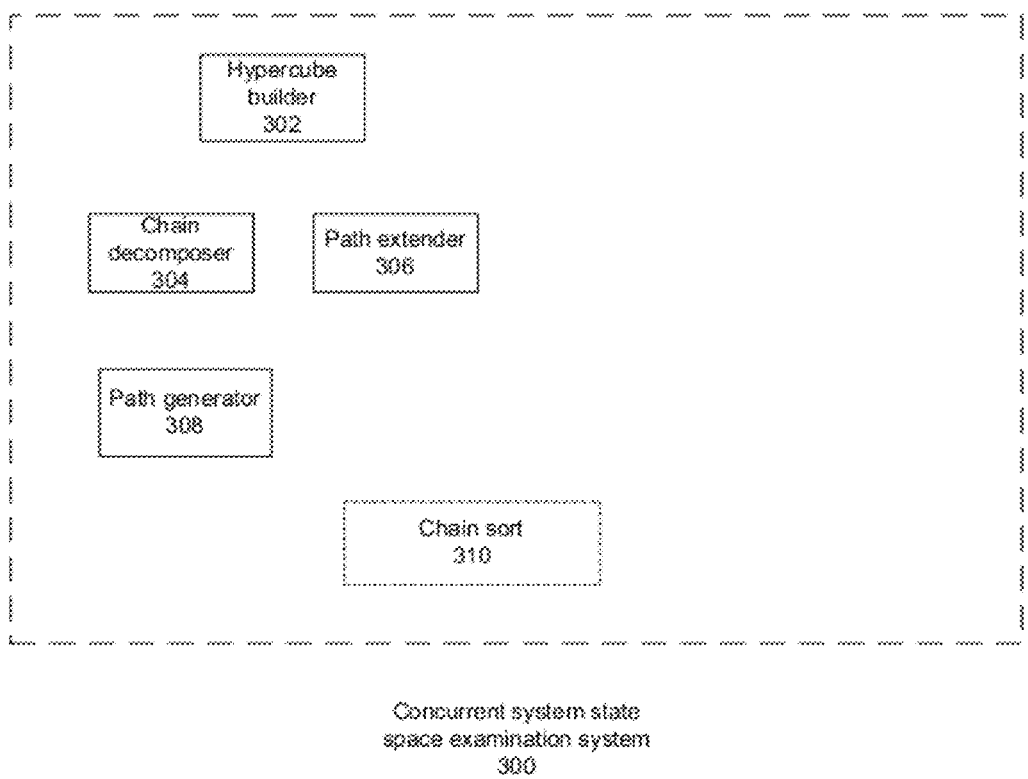
FIG. 3 is a block diagram of components of a concurrent system state space examination system, in accordance with various embodiments of the disclosure.

With reference to FIG. 3, a block diagram of components of a concurrent system state space examining system, in accordance with various embodiments of the disclosure is presented. Concurrent system state space examination system 300 is an example of a system enabling examination of a state space of a concurrent system.

An embodiment of a concurrent system state space examination system 300 may enable examination of a state space of a concurrent system using, e.g., a first set of paths providing a partial amount of uncovered information, which is as rich as possible. The result may imply a process of the embodiment follows a strategy and makes assumptions for model information, which may be important.

For example, when a state s1 in which all concurrent events have already executed in a few different orders, executing a subset of the events that has not been executed yet may be more likely to yield interesting information than executing a subset of the events that was already executed, but in a different order (since the latter may be more likely to lead to a previously visited state equivalent).

Using the previous assumption, an embodiment of concurrent system state space examination system 300 may examine the state space of a concurrent system using, e.g., a number of components including but not limited to, hypercube builder 302, chain decomposer 304, path extender 306, path generator 308 and optionally chain sort 310. Concurrent system state space examination system 300 may model a system as a partially ordered set, and may use a minimal chain decomposition of the order as a starting point for the state space examination. Using this technique, an examination strategy traversing every possible state in a minimal number of passes (this minimal number may be the width of the ordered set) is efficiently (e.g., with respect to the size of the state space) generated.

Hypercube builder 302 may provide a capability of modeling a system that has n concurrent events to build a hypercube of dimension n. The resulting hypercube may provide edges in which each edge corresponds to an execution of an event, while a vertex may correspond to a state defined by a set of executed events.

Chain decomposer 304 may provide a capability of creating a minimal chain decomposition of the hypercube. Chain decomposition can be accomplished using known techniques including, e.g., minimal chain decomposition (for example, I. Anderson, "Combinatorics of Finite Sets," Oxford Univ. Press, London, 1987) or canonical symmetrical chain decomposition (T. Hsu, M. Logan, S. Shahriari and C. Towse, "Partitioning the Boolean Lattice into Chains of Large Minimum Size", Journal of Combinatorial Theory, Vol. 97(1), January 2002, pp. 62-84). A minimal set of elements covering all elements of the order may be desired; therefore chain decomposition is used to provide the minimal set.

All chains may be extended using path extender 306 to obtain complete paths. Paths may be extended to include the initial starting point in all paths ensuring consistency and completeness. All (or nearly all) obtained paths from path extender 306 may be explored first, followed by remaining paths generated by path generator 308 using, for example, a depth first traversal of the underlining graph.

Chain sort 310 optionally may be used to order the chains according to a decreasing number of elements in the chain decomposition. Processing longer chains first may ensure coverage of possibilities sooner.

Figure 4:
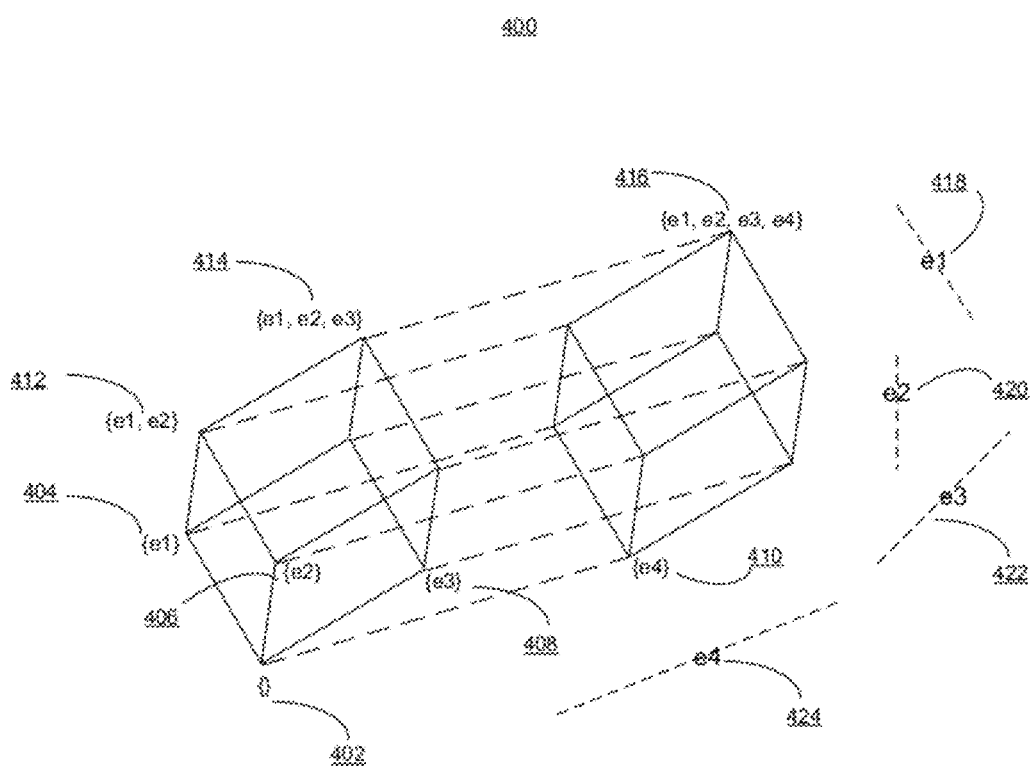
FIG. 4 is a schematic diagram of a hypercube representative of a modeled system, in accordance with one embodiment of the disclosure.

With reference to FIG. 4, a schematic diagram of a hypercube representative of a modeled system, in accordance with one embodiment of the disclosure is presented. Hypercube 400 is an example of a hypercube used, e.g., to determine a minimal subset of events, which may be explored in a concurrent system.

Using hypercube 400 may enable eventual enumeration of all the possible sequences for executing concurrent events that are enabled from states of a concurrent system in such a way that will, as much as possible, execute a subset of events that may have never been executed before. To simplify the description, assume for example purposes only exploring a state that has number of enabled concurrent events, represented as n, and referred to as $e_1, e_2, \ldots e_n$ (n events are independent, that is, executing a given subset of events in any order may lead to the same state). For example, assume there are $2^n$ possible subsets of events, which, when ordered by inclusion, define a hypercube of size n, with n! different paths from the bottom to the top. In this example, hypercube 400 has a dimension of four corresponding to the execution of events e1, e2, e3 and e4.

There are 4!=24 different paths in hypercube 400, with $2^4$=16 different states. Therefore, enumeration of the 24 paths such that the 16 states may be visited as early as possible in the process is desired. Each state may be represented as an event or node in hypercube 400. Node 402 may be an initial node represented by { }, an empty set. A complete path may therefore correspond to a series of linked events commencing with an initial point of node 402. Node 404, node 406, node 408 and node 410 are directly chained from node 402. Node 412, node 414, and node 416 are linked through a series of one or more nodes as indicated by the number of events in the label.

Each edge may correspond to the execution of a given event (as per the legend on the right containing legend identifier 418, legend identifier 420, legend identifier 422 and legend identifier 424) and each vertex may correspond to the state defined by the set of executed events (only some of the states are labeled with the corresponding set of events for readability).

With reference to FIG. 5, a text representation of a minimal chain decomposition of the hypercube of FIG. 4, in accordance with one embodiment of the disclosure is presented. Table 500 is an example of a sequence of all possible paths represented by hypercube 400 of FIG. 4. Minimal chain decomposition 502 is representative of hypercube 400 of FIG. 4.

Hypercube 400 of FIG. 4 is a partially ordered set (a lattice in this case), and each path of the hypercube is actually a chain of the order, that is, a set of pairwise comparable elements. Finding a set of chains that cover all the elements of the order is known as a chain decomposition of the order. As stated previously, a possible goal may be the traversal of hypercube 400 of FIG. 4 using as few chains as possible. The goal might be accomplished using, e.g., a minimal chain decomposition of the order (for example of an overview of these concepts see I. Anderson, "Combinatorics of Finite Sets," Oxford Univ. Press, London, 1987). A minimal number of chains necessary to decompose an order may be equal to the width of the order, that is, the maximum number of pairwise non-comparable elements (R. P. Dilworth, (1950), "A Decomposition Theorem for Partially Ordered Sets", Annals of Mathematics, vol. 51, 1951, pp. 161-166). In the case of the hypercube of size n, the width is equal to $$\binom{n}{]n/2[}$$

where $]n/2[$ represents a floor value.

For example, using hypercube 400 of FIG. 4 with a size 4, the width is determined as $$\binom{4}{2}$$

for a value of 6. Therefore, the goal may be achieved with 6 paths, as the least number of paths to traverse to cover all events. An example of a sequence of all 24 possible paths, which may reach all 16 states within the first 6 paths, is provided in table 500. Table 500 depicts a set of events comprising all 24 possible paths as set 504. A subset of events 506 represents the 16 states traversed within the first six paths. Path 508 represents a first path comprising a sequence of nodes in order assuming an initial point of zero.

One practical way to obtain such decomposition is to use, e.g., the so-called canonical symmetric chain decomposition (CSCD) (T. Hsu, M. Logan, S. Shahriari and C. Towse, "Partitioning the Boolean Lattice into Chains of Large Minimum Size", Journal of Combinatorial Theory, Vol. 97(1), January 2002, pp. 62-84). Canonical symmetric chain decomposition is typically performed efficiently, that is, polynomial in the size of the resulting model. Canonical symmetric chain decomposition is however not the only way to obtain such a decomposition, and any known chain decomposition technique may be used.

Applying canonical symmetric chain decomposition to hypercube 400 of FIG. 4 having a dimension 4 generates 6 minimal chain decompositions of minimal chain decomposition 502. Minimal chain decomposition 502 comprises a set of chains 510. A first chain the set is chain 512. Chain 512 contains a first element 514. Element 514 may be the initial state or starting point for all other chains. Path extension may be used to include the starting point in all generated paths ensuring consistency and completeness.

Figure 6:
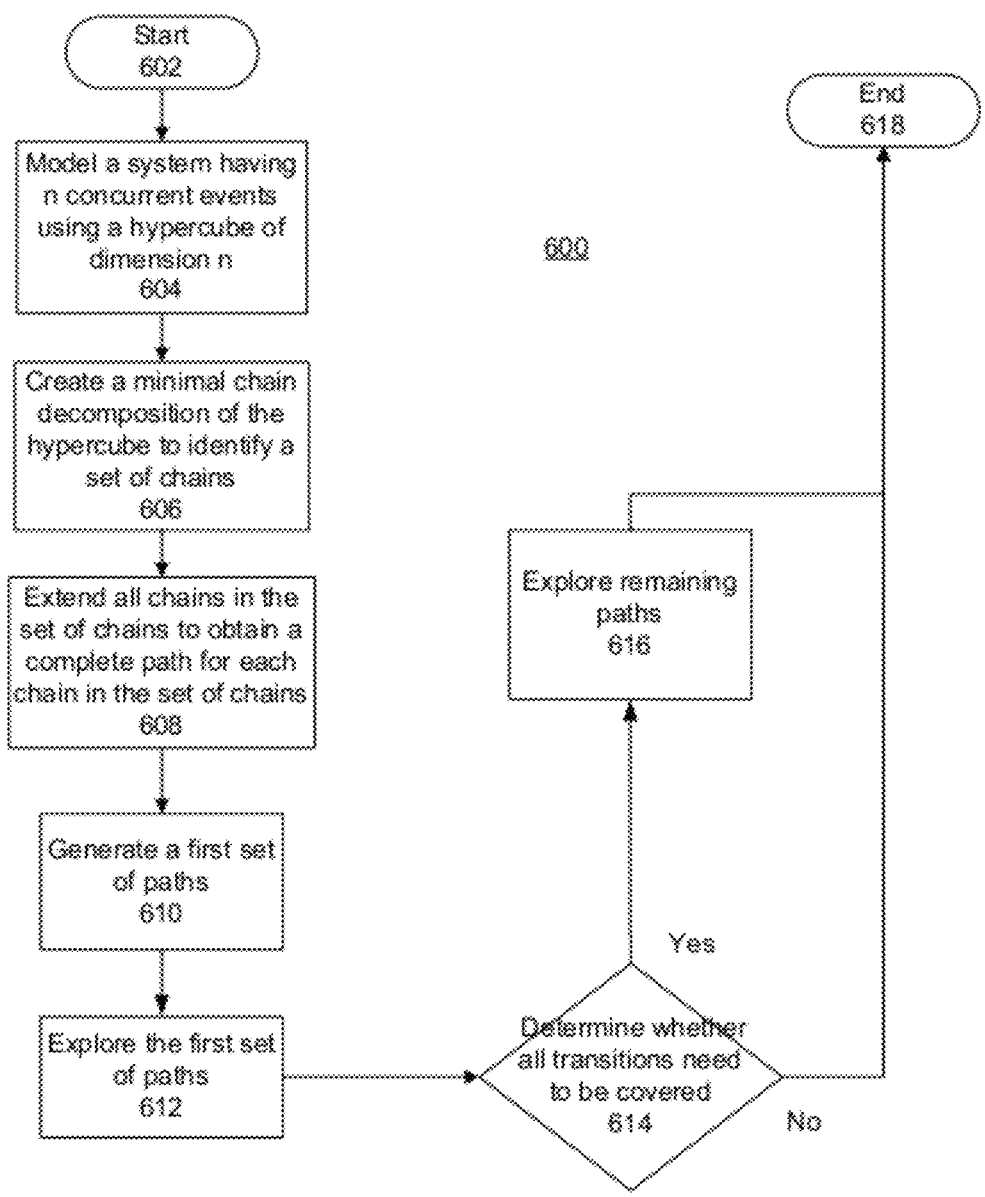
FIG. 6 is a flowchart of a process used for examining concurrent system state space, using the concurrent system state space examination system of FIG. 3, in accordance with one embodiment of the disclosure.

With reference to FIG. 6, a flowchart of a process for examining concurrent system state space, using the concurrent system state space examination system of FIG. 3, in accordance with one embodiment of the disclosure is presented. Process 600 is an example of a process providing a capability for efficiently examining concurrent system state spaces. Using the canonical symmetric chain decomposition, described in FIG. 5, typically enables efficiently exploring concurrent system state spaces.

Process 600 starts (602) and may model a system having a number of concurrent events n using a hypercube of dimension n (604). Process 600 may create a minimal chain decomposition of the hypercube to identify a set of chains (606).

To obtain a complete solution, paths between events of the concurrent system may be completed. Use of a hypercube to describe the concurrent system state space and using chain decomposition may not necessarily result in complete paths, but may provide simple chains inside the hypercube. All chains in the set of chains may be extended by process 600 into paths going from the bottom to the top to obtain a complete path for each chain in the set of chains (608). For example, to complete the chains, for each chain, process 600 may create a path from the bottom to the smallest element s of the chain by adding to the empty set (the bottom of the hypercube or starting point) all the events that are part of s, one event at the time, in any order. Process 600 may create a path from the largest element l of the chain to the top by adding to l all the events that are missing from the largest element, one event at the time, in any order.

Process 600 may generate a first set of paths from the set of chains (610). Chain decomposition alone may not necessarily obtain all paths; rather only a small subset of the possible paths may be obtained initially. Process 600 may explore the first set of paths (612). Process 600 optionally may determine whether all transitions need to be covered (614). Step 614 is optional in process 600 because, e.g., the first set of paths resulting from the minimal chain decomposition may provide the optimal set of paths for reaching all possible states. Completing examination of remaining paths of interest in a second set of paths may be done for completeness. Responsive to a determination that more paths of interest exist, process 600 may explore remaining paths (616) and may terminate thereafter (618). Exploration of remaining paths may commence with paths previously visited in which generation of all possible paths is obtained by following any kind of depth-first strategy on the graph induced by the created hypercube. 616 may not be needed (and related prior 614) when the purpose of the task is, e.g., to visit only the states of the concurrent system. Responsive to a determination that more paths of interest do not exist, process 600 may terminate (618) as in a typical operation of the process.

In another illustrative embodiment, using the above described process with a concurrent system that has n enabled concurrent events, canonical symmetric chain decomposition may be created for the hypercube of size n. The resulting set of chains may be ordered by, e.g., decreasing number of elements in the canonical symmetric chain decomposition. Each of the produced chains may be extended to n elements by, e.g., removing all events, one event after another event from the smallest set of the chain, and by adding all the missing events, one event after another event, from the largest set of the chain.

This variation of process 600 may provide the first $$\binom{n}{]n/2[}$$

paths, covering all possible sets of events, which may be the optimal number of paths required. After covering the first paths, the other paths may be explored, for example, by performing a depth-first traversal of the graph induced by the hypercube, starting from the paths that have already been visited. When determinism may be a requirement, every choice may be done in a deterministic way, wherein executing the described process a second time leads to the same result.

Thus is presented in an illustrative embodiment a computer-implemented process for examining concurrent system state space. The computer-implemented process may model a system having concurrent events to create a modeled system and may create a minimal chain decomposition of the modeled system to identify a set of chains. The computer-implemented process may extend all chains in the set of chains, and may generate a first set of paths, wherein the first set of paths may be a minimal set of paths covering all states of the modeled system. The computer-implemented process may explore the first set of paths. The computer-implemented process may optionally determine whether all transitions have been covered and responsive to a determination that all transitions have not been covered, may explore remaining paths by traversing a graph induced by the modeled system using a depth-first strategy.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications and/or any combinations of embodiment(s) as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for examining concurrent system state space, the computer-implemented process comprising:

modeling a system having concurrent events to create a modeled system;

creating a minimal chain decomposition of the modeled system to identify a set of chains;

extending all chains in the set of chains, wherein all the chains include a plurality of chains and wherein extending all chains in the set of chains comprises:

creating a path for each chain, from a bottom to a smallest element s of a chain by adding to an empty set all events that are part of s, one event at the time, in any order; and
creating a path from a largest element l of a chain to a top by adding to l all events that are missing from a largest element, one event at the time, in any order;
generating a first set of paths, wherein the first set of paths is a minimal set of paths covering all states of the modeled system; and
exploring the first set of paths.

2. The computer-implemented process of claim 1 wherein modeling the system having concurrent events to create the modeled system comprises:
creating a hypercube of dimension n, wherein n is a number of events in the system having concurrent events.

3. The computer-implemented process of claim 1 wherein generating the first set of paths comprises:
creating a minimal number of chains necessary to decompose an order wherein the minimal number is equal to a width of the order of the modeled system.

4. The computer-implemented process of claim 1 wherein generating the first set of paths comprises:
generating a small subset of all possible paths, wherein the small subset comprises all states within the modeled system.

5. The computer-implemented process of claim 1 wherein creating the minimal chain decomposition of the modeled system to identify the set of chains comprises:
ordering the set of chains by decreasing number of elements in a canonical symmetric chain decomposition.

6. The computer-implemented process of claim 1 wherein exploring the first set of paths comprises:
determining whether all transitions have been covered; and
responsive to a determination that all transitions have not been covered, exploring remaining paths by traversing a graph induced by the modeled system using a depth-first strategy.

7. A computer program product residing on a non-transitory computer readable medium having a plurality of instructions stored thereon which, when executed by a processor, cause the processor to perform operations comprising:
modeling a system having concurrent events to create a modeled system;
creating a minimal chain decomposition of the modeled system to identify a set of chains;
extending all chains in the set of chains, wherein all the chains include a plurality of chains and wherein the operations for extending all chains in the set of chains comprises:
creating a path for each chain, from a bottom to a smallest element s of a chain by adding to an empty set all events that are part of s, one event at the time, in any order; and
creating a path from a largest element l of a chain to a top by adding to l all events that are missing from a largest element, one event at the time, in any order;
generating a first set of paths, wherein the first set of paths is a minimal set of paths covering all states of the modeled system; and
exploring the first set of paths.

8. The computer program product of claim 7 wherein the operations for modeling the system having concurrent events to create the modeled system comprises:
creating a hypercube of dimension n, wherein n is a number of events in the system having concurrent events.

9. The computer program product of claim 7 wherein the operations for generating the first set of paths comprises:
creating a minimal number of chains necessary to decompose an order wherein the minimal number is equal to a width of the order of the modeled system.

10. The computer program product of claim 7 wherein the operations for generating the first set of paths comprises:
generating a small subset of all possible paths, wherein the small subset comprises all states within the modeled system.

11. The computer program product of claim 7 wherein the operations for creating the minimal chain decomposition of the modeled system to identify the set of chains comprises:
ordering the set of chains by decreasing number of elements in a canonical symmetric chain decomposition.

12. The computer program product of claim 7 wherein the operations for exploring the first set of paths comprises:
determining whether all transitions have been covered; and
responsive to a determination that all transitions have not been covered, exploring remaining paths by traversing a graph induced by the modeled system using a depth-first strategy.

13. An apparatus for examining concurrent system state space, the apparatus comprising:
a communications fabric;
a memory connected to the communications fabric, wherein the memory contains computer executable program code;
a communications unit connected to the communications fabric;
an input/output unit connected to the communications fabric;
a display connected to the communications fabric; and
a processor unit connected to the communications fabric, wherein the processor unit executes the computer executable program code to direct the apparatus to:
model a system having concurrent events to create a modeled system;
create a minimal chain decomposition of the modeled system to identify a set of chains;
extend all chains in the set of chains, wherein all the chains include a plurality of chains and wherein the processor unit executes the computer executable program code to extend all chains in the set of chains further directs the apparatus to:
create a path for each chain, from a bottom to a smallest element s of a chain by adding to an empty set all events that are part of s, one event at the time, in any order; and
create a path from a largest element l of a chain to a top by adding to l all events that are missing from a largest element, one event at the time, in any order;
generate a first set of paths, wherein the first set of paths is a minimal set of paths covering all states of the modeled system; and;
explore the first set of paths.

14. The apparatus of claim 13 wherein the processor unit executes the computer executable program code to model the system having concurrent events to create the modeled system further directs the apparatus to:
create a hypercube of dimension n, wherein n is a number of events in the system having concurrent events.

15. The apparatus of claim 13 wherein the processor unit executes the computer executable program code to generate the first set of paths further directs the apparatus to:

create a minimal number of chains necessary to decompose an order wherein the minimal number is equal to a width of the order of the modeled system.

16. The apparatus of claim 13 wherein the processor unit executes the computer executable program code to generate the first set of paths further directs the apparatus to:
generate a small subset of all possible paths, wherein the small subset comprises all states within the modeled system.

17. The apparatus of claim 13 wherein the processor unit executes the computer executable program code to create the minimal chain decomposition of the modeled system to identify the set of chains further directs the apparatus to:
order the set of chains by decreasing number of elements in a canonical symmetric chain decomposition.

* * * * *